Figure 1:
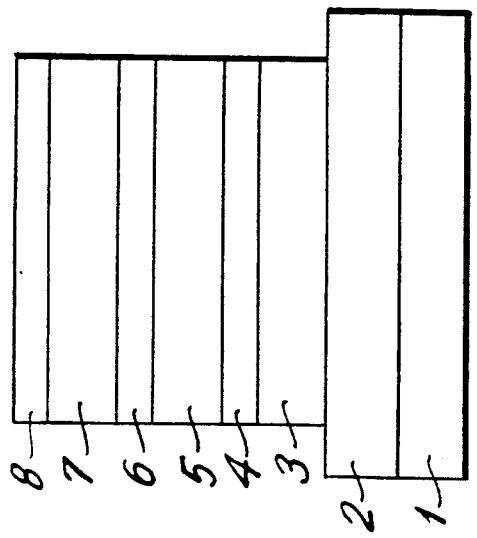

United States Patent
Chu et al.

[11] Patent Number: 5,260,821
[45] Date of Patent: Nov. 9, 1993

[54] ELECTROCHROMIC SYSTEM

[75] Inventors: Wing F. Chu; Volker Leonhard, both of Frankfurt am Main; Rolf Hartmann, Kelkheim; Gertraud Ganson, Oberursel; Werner Weppner, Stuttgart, all of Fed. Rep. of Germany

[73] Assignee: SCHUCO International KG, Bielefeld, Fed. Rep. of Germany

[21] Appl. No.: 863,937

[22] Filed: Apr. 6, 1992

[30] Foreign Application Priority Data

Apr. 12, 1991 [DE] Fed. Rep. of Germany ....... 4111944

[51] Int. Cl.$^5$ .............................................. G02F 1/153
[52] U.S. Cl. ..................................... 359/269; 359/270
[58] Field of Search ................................. 359/269, 270

[56] References Cited

U.S. PATENT DOCUMENTS 5,202,788  4/1993  Weppner ........................... 359/269

FOREIGN PATENT DOCUMENTS 0144127  9/1980  Fed. Rep. of Germany ...... 359/269

Primary Examiner—Bruce Y. Arnold
Assistant Examiner—Evelyn A. Lester
Attorney, Agent, or Firm—Sprung Horn Kramer & Woods

[57] ABSTRACT

An electrochromic system. It comprises layers of solid/materials deposited on glass or another substrate. The solids function in an atmosphere that can be dry. One layer is preferably $Li_3AlF_6$ and conducts positive lithium ions. Another layer is a counterelectrode. The counterelectrode is improved to the extent that it can reversibly accept ions from and donate them to the ion conductor while remaining extensively transparent. The counterelectrode can be $Li_xTiO_y$, $(Li_2O)_m(WO_3)_n(Sb_2O_3)$, or $(Li_2O)_m(WO_3)_n(CeO_2)_o$.

9 Claims, 1 Drawing Sheet

ELECTROCHROMIC SYSTEM

The invention concerns electrochromic systems. Such systems comprise layers of solid materials deposited on glass or another substrate. The solids function in an atmosphere that can be dry. Their purpose is to let different intensities of energy through. One field of application is the modulation of light. The substrate can be either transparent or reflecting. One or more of the layers can also be reflecting.

The electrochromism exploited in these systems is a property of various transition-metal oxides. It has long been known and exploited. Electrochromism is a reversible addition or subtraction of color to or from a transparent or colored material as the result of an electric current flowing through it. It is a redox process that occurs in an electrochemical "cell," wherein one of the electrodes is oxidized and the other reduced, depending on what direction the current is flowing in. Charges are transported inside the cell by ions flowing through an electrolyte separating the electrodes. The phenomenon is described for example by Junichi Nagai in "Advances in Research and Applications of Electrochromic Smart Windows," Solid State Ionics, 40 & 41 (1990), 383–87. Such "smart windows" are coated with a thin film that increases their opacity as desired.

An electrochromic cell constructed of layers of such solids can be represented schematically as glass | $In_2O_3$:Sn | $WO_3$ | ion conductor | counterelectrode | $In_2O_3$:Sn.

The tin-doped indium oxide $In_2O_3$:Sn, called ITO, is a known electrically conductive transparent oxide conventional as an input or contact layer for electrochemical-solid cells. Of all the oxides that exhibit electrochromism, the tungsten oxide $WO_3$ is the most discussed in the literature (e.g. J.S.E.M. Svensson & C. G. Granqvist, "Electrochromic Coatings for Smart Windows: Crystalline and Amorphous $WO_3$ Films," Thin Solid Films 126 [1985], 31–6).

The counterelectrode and ion conductor are critical components that dictate how the systems function. They must be capable of being produced by high-temperature vapor deposition, sputtering, sol-gel coating, or laser vaporization. The ion conductor must, in addition to satisfactory conductivity, have as much stability as possible, especially with respect to compatibility with its adjacent phases. The counterelectrode, applied in a thin film, must in addition to the aforesaid manufacturing criteria a) be able to continuously donate ions to and accept them from the ion conductor,
b) remain extensively transparent while donating and accepting ions, and
c) conduct both electrons and ions.

The materials heretofore suggested for ion conductors and in particular for counterelectrodes do not satisfy these criteria very well.

Guang Wei, T. E. Haas, and R. B. Goldner describe $LiCoO_2$ for example in "Lithium Cobalt Oxide Thin Film and its Electrochromism," Proc. Electrochemical Society 2 (1990), 80–88. They report that the substance's electrochromic behavior is basically detrimental and anodic.

U.S. Pat. No. 4,832,463 proposes $LiNbO_3$ as an ion conductor, but it is difficult to obtain the desired conductivity when it is sputtered on.

The phase stability of the ion conductor $LiAlF_4$ discussed in "Amorphous Thin Film Ionic Conductors of $mLiF.nAlF_3$," Materials Research Bulletin 16 (1986), 1281–89, is not particularly satisfactory.

Positive lithium-ion conductors have been demonstrated superior to other solid electrolytes, $MgF_2$ for example, and the point of departure for the present invention is accordingly an electrochromic system that employs a positive lithium-ion conductor. The object is to generally improve the system's properties, function, and stability.

The embodiment recited in claim 1 is a decided improvement due to the use of an $Li_xTiO_y$ at the specified stoichiometries.

Materials of such compositions have no inherent electrochromism. As will be evident from research cited hereinafter, the incorporation and release of positive lithium ions is adequately reversible. $Li_2TiO_3$ for example transports charges better than $LiCoO_2$. $Li_2TiO_3$ is commercially available and accordingly inexpensive and can like the other compositions be deposited in a thin enough film by various common processes and by electrochemical titration.

This material is employed for the first time for this purpose in accordance with the present invention. Doping it with oxides or fluorides will improve its natural electron-conducting ability and positive lithium-ion forwarding capacity even more. The same process can establish the system's oxygen activity. Basically, the lithium titanate can also include other contaminants, which will either slightly improve the properties or have no detectable effect.

The materials recited in claim 2 are similarly appropriate for counterelectrodes. The composite oxides $(Li_2O)_m(WO_3)_n(Sb_2O_3)_o$ and $(Li_2O)_m(WO_3)_n(CeO_2)_o$ with the recited stoichiometries can easily be obtained in thin transparent layers by the aforesaid common processes, including titration. Modulation is also slight, meaning that the layers will remain transparent when positive lithium ions are extracted from them or pumped into them. They transport charges well by a mechanism that is sufficiently reversible.

Ordinary contaminants and optional dopes may be present.

The counterelectrodes in accordance with the invention can basically be employed with the known ion conductor $LiAlF_4$ or with other lithium-conducting solid electrolytes, solid solutions of $Li_4SiO_4$ and $Li_3PO_4$ for example. Combination with the ion-conducting $Li_3AlF_6$ in accordance with the invention, however, is preferred. Although $Li_3AlF_4$, admittedly has a lower specific ionic conductivity than $LiAlF_4$, it can still be successfully employed in layers 150 to 250 nm thick, which are thin enough for absolutely satisfactory ion conductivity.

The crystal structure of $Li_3AlF_6$ provides it with a wider range of phase stability than $LiAlF_4$, which makes it a stable ion conductor for the present purpose. It can also be evaporated. It can also be deposited in a thin layer by the aforesaid conventional processes without critical shrinkage.

The system in accordance with the invention also employs layers of $MgF_2$ as adhesion promoters and anti-moisture coatings on both sides of the ion-conducting solid electrolytes.

The invention will now be specified with reference to the drawing, wherein

Figure 2:
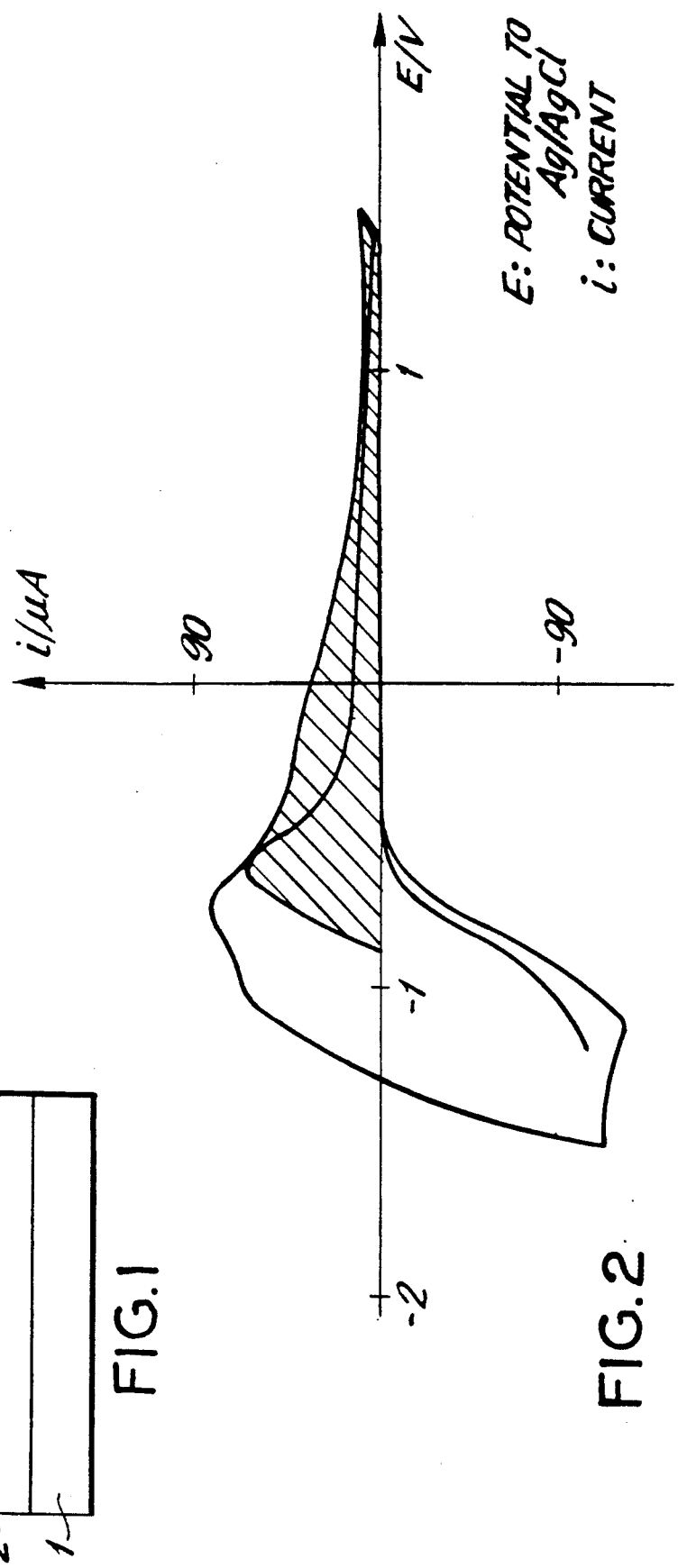

FIG. 1 illustrates one embodiment of the system in accordance with the invention and FIG. 2 is a current/voltage graph illustrating the counterelectrode's reversible Li-ion intake and output within the system.

The system illustrated in FIG. 1 includes a stack of thin films 2 through 8 on a glass substrate 1. The layers can be generated by such known processes as vapor deposition, sputtering, sol-gel coating, laser vaporization, or any other.

The electrochromic system has in a known way two transparent and conductive ITO contact layers, each approximately 150 nm thick, specifically an upper ITO contact layer 8 and a lower ITO contact layer 2. Layer 2 is in contact with the glass. The electrochromically active layer itself is a layer of $WP_3$ approximately 400 nm thick. It is connected by an adhesive layer 4 of magnesium-fluoride approximately 10 nm thick to a solid-electrolyte layer 5 of $Li_3AlF_6$ approximately 200 nm thick. Another layer 6 of magnesium fluoride approximately 10 nm thick functions as an adhesion promoter and seal against moisture between solid-electrolyte layer 5 and a combination-oxide counterelectrode 7 of $Li_xTiO_y$, approximately 900 nm thick. Upper ITO contact layer 8 is applied on top of counterelectrode 7.

The solid-electrolyte layer 5 in accordance with the invention is the lithium-aluminum fluoride $Li_3AlF_6$ obtained from $LiF_3$ and $AlF_3$ in a molar ratio of 1:3. This material has extensive phase stability and can be evaporated. Any appropriate and in-principle known process can be employed to apply the layer. The $LiF_3$ and $AlF_3$ can be vapor-deposited at a molar in a vacuum for example.

The $Li_xTiO_y$-counterelectrode layer 7 in accordance with the invention can be obtained either directly from a $Li_2TiO_3$ source or by electrochemical titration from a layer of $TiO_2$. The latter approach will now be described. A layer of $TiO_2$ is applied to a glass substrate 1 coated with an ITO contact layer by one of the aforesaid thin-layer techniques. Lithium is electrically titrated into the layer of $TiO_2$. An electrochemical cell with a liquid electrolyte, $LiClO_4$ in propylene carbonate for example, and a platinum electrode is provided with the structure

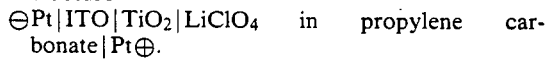

$\ominus Pt|ITO|TiO_2|LiClO_4$ in propylene carbonate$|Pt\oplus$.

Voltage is applied to the platinum electrodes, transporting positive lithium ions into the $TiO_2$ layer. As oxygen is absorbed, from the atmosphere for example, an $Li_x$-$TiO_y$ that satisfies the aforesaid requisites for the counterelectrode will form. The other layers can then be created by any desired process.

It is also possible to dope counterelectrode 7 with such oxides and/or fluorides as SrO, MgO, $CeO_2$, $SnO_2$, $Sb_2O_3$, $Nb_2O_3$, $AlF_3$, $CeF_3$, and LiF. Doping with materials of this type can increase electron conductivity and positive lithium-ion mobility even more. The doping can also be employed to vary the system's oxygen activity. The specified materials can also be present as a second phase. As with the doping, this may also increase chemical diffusion.

FIG. 2 illustrates the results of potentiodynamic measurements of the reversibility of the counterelectrode material in an electrochemical cell with a liquid electrolyte of $LiClO_4$ in propylene carbonate, a silver/silver-chloride reference electrode, and a platinum counterelectrode and with the structure glass$|ITO|Li_2TiO_3|LiClO_4$ in propylene carbonate-platinum.

The plot represents the current detected with a potential E on the reference electrode. The flux corresponds in accordance with polarity to the process of positive-lithium ion intake and release. It will be evident that both processes are reversible. The same tests demonstrate the constant presence of an adequate primary charge transport (from the hatched area) of more than 20 $mC/cm^2$.

The layers do not necessarily have to have the thicknesses cited with reference to FIG. 1 but can vary considerably. Solid-electrolyte layer 5 must of course not be too thick to conductions, and should accordingly be between 150 and 250 nm. Much thinner layers can cause short circuits.

It is also possible to position ITO contact layer 8 instead of ITO contact layer 2 against the glass. $WO_3$ is the preferred but not the only possible electrochromic material. Such materials as $MoO_3$, $I_rO_2$, and $V_2O_5$ can be used in accordance with the invention for layers 7 and 5.

Materials other than glass, even colored materials, can be employed for the substrate. The colored substrate will be visible as long as the layers are transparent and invisible when they become opaque. This characteristic can be exploited for flat video screens or for large signs.

Although the point of departure for the embodiment described herein is commercially available $Li_2TiO_3$, the other stoichiometries recited in claim 1 and the other materials recited in claim 2 can also be employed.

We claim:

1. Electrochromic system in the form of layers of solid materials on a substrate with a solid electrolyte in the form of a layer that conducts positive lithium ions, characterized in that the counterelectrode layer (7) is $Li_xTiO_y$, whereby $0.36 \leq x \leq 2$ and $1.8 \leq y \leq 3$.

2. Electrochromic system in the form of layers of solid materials on a substrate with a solid electrolyte in the form of a layer that conducts positive lithium ions, characterized in that the counterelectrode layer is $(Li_2O)_m(WO_3)_n(Sb_xO_3)_o$ or $(Li_2O)_m(WO_3)_n(CeO_2)_o$, whereby $0.3 \leq m \leq 0.49$, $0.21 \leq n \leq 0.38$, and $0.26 \leq o \leq 0.43$.

3. System as in claim 1, characterized in that the counterelectrode layer (7) is doped or contaminated with oxides and/or fluorides.

4. System as in claim 3, characterized in that the dopes or contaminants are SrO, MgO, $CeO_2$, $SnO_2$, $Sb_2O_3$, $Nb_2O_3$, $AlF_3$, $CeF_3$, or LiF.

5. System as in one of the foregoing claims, characterized in that the layer (5) that conducts the positive lithium ions is $Li_3AlF_6$.

6. System as in one of claims 1–4, characterized by a layer (4 & 6) of $MgF_2$ over the top and bottom of the layer (5) that conducts the positive lithium ions to bond it to an electrochromic layer (3) and to the counterelectrode layer (7).

7. System as in claim 6, characterized in that the electrochromic layer (3) is $WO_3$.

8. System as in claim 6, characterized in that the inner layers (3 through 7) and contact layers (2 & 8) are produced by such known processes as high-temperature vapor deposition, sputtering, sol-gel coating, or laser vaporization.

9. System as in one of claims 1 through 4, characterized in that the counterelectrode layer (7) is produced by electrochemical titration.

* * * * *